United States Patent
Nakajima et al.

[15] 3,680,318
[45] Aug. 1, 1972

[54] CENTRALIZED AIR-POLLUTION PREVENTIVE SYSTEM

[72] Inventors: Yasuo Nakajima, No. 16, 1-chome, Futaba, Yokosuka; Yoshimasa Hayashi, Kudencho Danchi 4-201 No. 740, Kuden-cho, Tutsuka-ku, Yokohama; Toru Yoshimura, Nissan-Urago-Ryo No. 3-68, Oppamahigaski-cho, Yokosuka; Kunihiko Sugihara, Nissan-Nishitera-Ryo, No. 714 Nishiterao, Kanagawa-ku; Shin-ichi Nagumo, No. 2502, Shinohara-cho, Kohoku-ku, Yokohama, all of Japan

[22] Filed: Dec. 22, 1970

[21] Appl. No.: 100,690

[30] Foreign Application Priority Data

Dec. 29, 1969 Japan..............................45/859

[52] U.S. Cl. .................60/278, 60/283, 60/288, 60/290, 123/97 B, 123/117 A, 123/136
[51] Int. Cl..............................................F02b 75/10
[58] Field of Search....60/29 A, 30 R, 278, 283, 288, 60/289, 290, 285; 123/136, 97 B, 117 A, 119 A

[56] References Cited

UNITED STATES PATENTS

| | | |
|---|---|---|
| 3,272,191 | 9/1966 | Walker.................123/117 A |
| 3,282,046 | 11/1966 | Walker....................60/29 F |
| 3,301,242 | 1/1967 | Candelise................123/117 A |
| 3,368,345 | 2/1968 | Walker.........................60/30 R |
| 3,440,817 | 4/1969 | Saufferer......................60/29 A |
| 3,481,144 | 12/1969 | Morrell..........................60/30 R |
| 3,503,716 | 3/1970 | Berger..........................60/30 R |
| 3,533,386 | 10/1970 | Masaki.......................123/97 B |
| 3,548,797 | 12/1970 | Hagihara......................123/136 |
| 3,603,298 | 9/1971 | Toda...........................123/117 A |

*Primary Examiner*—Douglas Hart
*Attorney*—John Lezdey

[57] ABSTRACT

A centralized control system for coordinating a plurality of vehicular air-pollution preventive devices in such a manner as to minimize the harmful contents of the automotive exhaust gases. In a preferred embodiment, the system includes six air-pollution preventive devices; an ignition timing retarding device, an exhaust gas after-burning device, a fuel vapor trapping device, an exhaust gas recirculating device, an atmospheric air introducing device and a device for reducing hydrocarbon exhaust during deceleration. The system also includes five sensors; a vehicle speed sensor, an intake manifold vacuum sensor, a throttle opening sensor, an engine temperature sensor and an exhaust temperature sensor, and a controller adapted to determine the individual predetermined conditions of engine operation during which the air-pollution preventive devices are placed in operation, in accordance with electric signals supplied thereto from these sensors. The controller, upon determination of such conditions, operates to keep the devices operative.

19 Claims, 6 Drawing Figures

INVENTORS
YASUO NAKAJIMA, YOSHIMASA HAYASHI, TORU YOSHIMURA, KUNIHIKO SUGIHARA
and SHIN-ICHI NAGUMO INVENTOR
YASUO NAKAJIMA, YOSHIMASA HAYASHI, TORU YOSHIMURA, KUNIHIKO SUGIHARA, and SHIN-ICHI NAGUMO

CENTRALIZED AIR-POLLUTION PREVENTIVE SYSTEM

This invention relates to vehicular air-pollution preventive devices and more particularly to a centralized control system for coordinating a plurality of these devices in such a manner as to minimize the harmful contents of automotive exhaust gases.

Now that air-pollution caused by automobile exhaust emissions is a serious social problem, the development of pollution-free automobiles is a matter of great concern to automobile manufacturers. In an attempt to realize such automobiles, they have heretofore proposed and placed in practical use various anti-pollution measures which, however, are effective in reducing only limited harmful contents. These anti-pollution measures are classified by the type of pollutants as follows:

1. Unburned gases containing hydrocarbons, carbon monoxides, etc.:
   a. Retarding the ignition timing at low to intermediate engine outputs;
   b. Increasing the fuel flow to the cylinders during coasting;
   c. Injecting atmospheric air into the high temperature region of the exhaust system; and
   d. Introducing exhaust gases into a reactor for after-burning purposes.
2. Nitrogen oxides produced under high-temperature, high-pressure conditions:
   a. Retarding the ignition timing;
   b. Recirculating a portion of the exhaust gases to the intake manifold; and
   c. Injecting atmospheric air into the intake manifold.
3. Fuel evaporation:
   Using absorbent materials to capture fuel vapors in the carburetor and fuel tank.

Furthermore, it is important that air-pollution preventive devices implementing the above-enumerated measures be placed in operation only within the individual predetermined ranges of engine operating conditions, since the engine performance quality would otherwise be greatly deteriorated. Moreover, those devices employ a plurality of individual sensors to detect the engine operating conditions. Thus, in order to coordinate those various device in such a manner as to totally prevent emission of the harmful contents at all vehicle speeds and engine load conditions, a control system should be used which is extremely complicated in construction and which is troublesome to operate.

It is therefore an object of this invention to provide an improved centralized control system for vehicular air-pollution preventive devices with a view to overcoming the above-stated disadvantages.

Figure 1:
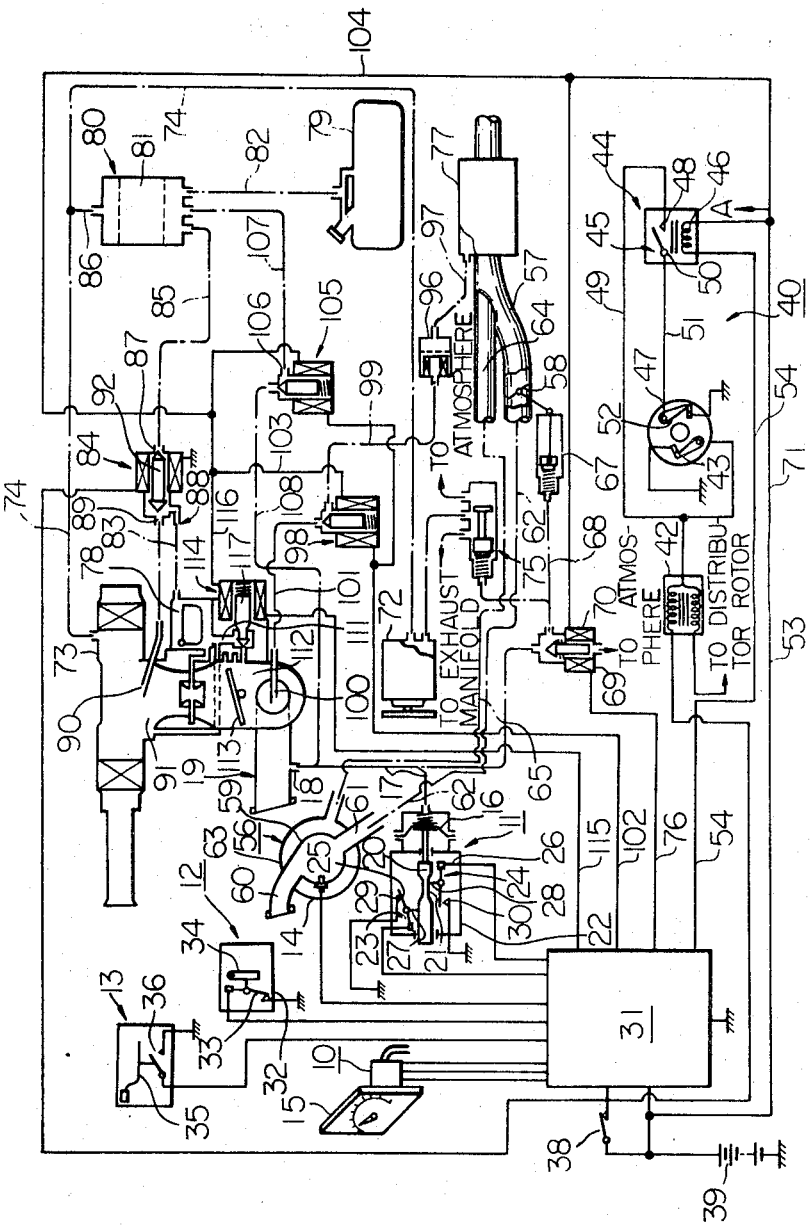
FIG. 1 is a schematic diagram showing a centralized control system embodying this invention.

Referring now to the drawings and particularly to FIG. 1, there is shown a centralized control system according to this invention, which comprises a plurality of sensors adapted to sense the engine operating conditions, such as a vehicle speed sensor 10, an intake manifold vacuum sensor 11, a throttle opening sensor 12, an engine temperature sensor 13 and an exhaust temperature sensor 14.

The vehicle sped sensor 10 is of the conventional type comprising an AC generator having a rotor which is drivably connected to the rotating shaft of a speed meter 15. Alternatively, an oscillator adapted to produce an oscillation output corresponding to the needle position of the speed meter or an ignition pulse receiver may be used.

The intake manifold vacuum sensor 11 is of the type comprising a spring-loaded and air-tight diaphragm 16 the spring-loaded side of which is connected through a vacuum line 17 to an opening 18 in the intake manifold 19. Connected to the diaphragm 16 is an elongated member 20 having a small diameter portion 21, which is mounted in a housing 22 for axial movement with the diaphragm 16. The housing 22 as shown includes two switches 23 and 24 having arms 25 and 26 which carry their respective legs 27 and 28 having one end resting upon the surface of the elongated member. The stationary contacts 29 and 30 of the switches 23 and 24, respectively, are grounded and the movable contacts are connected to a controller 31, the construction and operation of which will be described in reference to FIG. 6. The switches 23 and 24 are opened when the ends of the legs 27 and 28 carried by the respective arms 25 and 26 rest on the small diameter portion 21 of the elongated member 20. As an alternative, a rotary switch or a slide thermostat may be used.

The throttle opening sensor 12 comprises a switch 32 having an arm 33 which is operatively associated with a carburetor throttle valve (not shown) by means of a lever 34 so as to open the switch 32 when the throttle valve is opened to a predetermined angular degree.

The engine temperature sensor 13 comprises a bimetal 35 placed in the engine cooling water passage (not shown) and adapted to close a switch 36 when the engine temperature reaches a predetermined value. Alternatively, a thermostat or a thermometer may be used.

The exhaust temperature sensor 14 comprises a thermocouple or an equivalent (not shown) which is placed in the exhaust gas passage (not shown) to sense the temperature of the exhaust gases.

All the output signals from the above-described sensors are supplied to the controller 31 which is connected through an ignition switch 38 to a source of DC voltage such as a battery 39. The controller 31 determines the presence of the predetermined conditions of the engine under which the exhaust gases contain relatively large quantity harmful substances and, upon determination of such conditions, actuates a plurality of air-pollution preventive devices, which will be described hereinafter.

Figure 2:
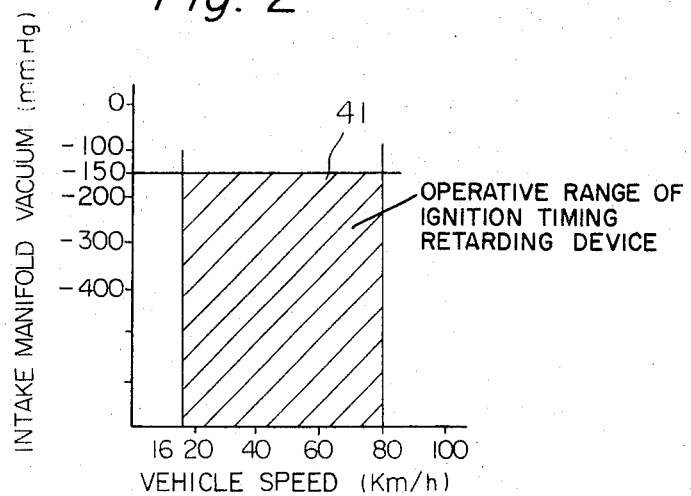
FIGS. 2 through 5 are graphic representation of the ranges of engine operating condition in which the vehicular air-pollution devices in the present system are placed in operation.

One of the air-pollution preventive devices incorporated in the present centralized control system is an ignition timing retarding device 40 which, when actuated, serves to reduce the quantity of carbon monoxides, hydrocarbons and nitrogen oxides contained in the exhaust gases. The device 40 is adapted to be operative during those conditions in which the engine is driven to produce low to intermediate outputs, that is, when the vehicle runs on a level road at low to intermediate speeds. Such conditions of engine operation are determined by the controller 31 in accordance with the electric signals supplied thereto from the vehicle speed sensor 10 and the intake manifold vacuum sensor 11. The hatched area 41 of FIG. 2 represents an example of the range of engine operating conditions in which the ignition timing retarding device 40 is operative. As shown in the lowermost part of FIG. 1, the ignition timing retarding device 40 is incorporated in a conventional ignition circuit comprising a DC voltage source 39, an ignition switch 38, an ignition coil 42, a breaker 43 and a distributor (not shown) and consists of a retard relay 44 having a switch 45 and a coil 46 and a retard breaker 47 adapted to be alternately opened, and closed according to the engine speed. The relay switch 45 has its stationary contact 48 connected through a line 49 to the ignition coil 42 and its movable contact 50 connected through a line 51 to the arm 52 of the retard breaker 47, the stationary contact 48 thereof being grounded. The relay coil 46 has its one end connected to the positive terminal of the battery 39 through a line 53 and its other end to the controller 31 through a line 54.

In operation, when the engine operating condition falls in the range corresponding to the hatched area 41 of FIG. 2, the controller 31 operates to connect the line 54 leading to the relay coil 46 to ground so as to actuate the relay 44, thereby establishing another ignition current path from the ignition coil 42 through the retard breaker 47 to ground. This results in a proper ignition retardation.

Another air-pollution preventive device included in the present control system is an exhaust gas after-burning device disclosed in our co-pending U.S. Ser. No. 58,516. This device, when activated, serves to reduce the quantity of carbon monoxides and hydrocarbons in the exhaust gases. The device is adapted to be kept operative during those conditions of engine in which the vehicle is travelling in urban areas at relatively low speeds. Such engine operating conditions are determined by the controller 31 on the basis of the electric signals supplied thereto from the vehicle speed sensor 10, intake manifold vacuum sensor 11 and exhaust temperature sensor 14. The hatched portion 55 of FIG. 3 represents an example of the range of engine operating conditions in which the exhaust gas after-burning device is kept operative.

The exhaust gas after-burning device essentially comprises a reactor 56 for re-oxidizing the unburned gases, a by-pass exhaust pipe 57 having a control valve 58 mounted therein, and means for supplying atmospheric air to the reactor 56. The reactor 56 includes an inner casing 59 having its inlet port 60 connected to the exhaust manifold (not shown) of the engine and its output port 61 to the by-pass exhaust pipe 57 by means of a conduit generally shown by the dash-and-dot line 62. The reactor 56 also includes an outer casing 63 surrounding the inner casing 59 and communicating with a major exhaust pipe 64 through a conduit as generally shown by the dash-and-dot line 65. The inner and outer casings 59 and 63 communicate with each other through a plurality of openings formed in a partition positioned therebetween, though not shown. The control valve 58 disposed in the by-pass exhaust pipe 57 is operatively associated with a vacuum switch 67 which in turn is pneumatically connected to the opening 18 in the intake manifold 19 through a conduit 68, a solenoid valve 69 and a conduit 70. The solenoid valve 69 includes a coil 70 having its one end connected to the controller 31 and the other end of the coil 70 connected to the battery 39 by means of a line 71.

The means for supplying atmospheric air to the reactor 56 comprises an air pump 72 connected to the air cleaner 73 of the engine through a conduit 74, and a vacuum switch 75 for causing the air pump 72 to selectively communicate with the exhaust manifold of the engine. The vacuum switch 75 is also pneumatically connected to the opening 18 in the intake manifold 19 through the solenoid valve 69.

Figure 3:
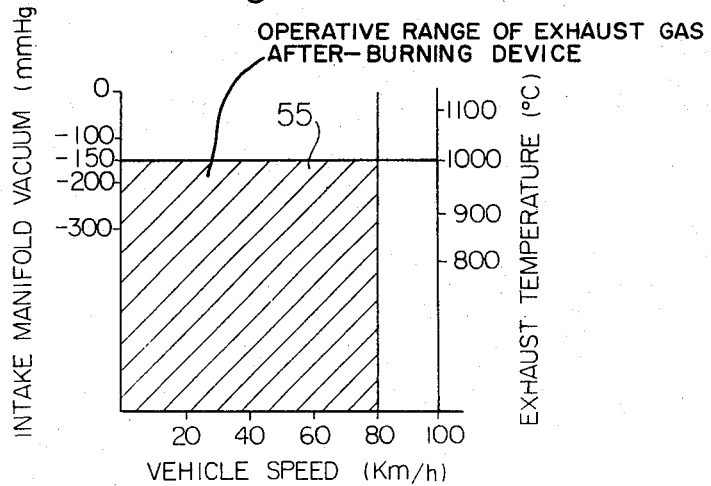

In operation, when the engine operating condition falls in the range corresponding to the hatched area 55 of FIG. 3, the controller 31 operates to connect a line 76 leading to the end of the solenoid coil 70 to ground so as to actuate the solenoid valve 69. The solenoid valve 69 is opened to interconnect the vacuum switch 67 with the intake manifold through the conduit 68. The vacuum switch 67 is actuated to move the control valve 58 to its closed position, shutting off the flow of exhaust gases through the inner casing 59 of the reactor 56, the by-pass exhaust pipe 57. Simultaneously, the other vacuum switch 75 is actuated to bring the air pump 72 into communication with the exhaust manifold. Thus, the exhaust gases passed through the exhaust manifold enter the inner casing 59 of the reactor 56, where the re-oxidation of the unburned hydrocarbons and carbon monoxides takes place, and then pass through the plurality of openings into the outer casing 63 of the reactor 56, since the control valve 58 is closed. Thereafter, the exhaust gases pass through the major exhaust pipe 64 into a muffler 77. Additional air required for the re-oxidization of the unburned gases is introduced from the air cleaner 73 through the conduit 74, air pump 72, and vacuum switch 75 into the exhaust manifold.

The centralized control system according to this invention also includes a conventional fuel vapor trapping device adapted to collect the fuel vapors escaping from the carburetor float bowl 78 and fuel tank 79. The device comprises a canister 80 containing absorbent materials 81 for absorbing fuel vapors escaping from the fuel tank 79 through a conduit 82. Fuel vapors in the carburetor fuel bowl 78 are passed through a conduit 83, a solenoid valve 84 and a conduit 85 into the canister 80, where they are absorbed in the absorbent materials 81. The canister 80 is connected through a conduit 86 to the air cleaner 73. The solenoid valve 84 has three ports 87, 88 and 89 leading from the canister 80, carburetor float bowl 78 and a nozzle 90 mounted in the air horn 91, respectively. Upon closure of the ignition switch, the solenoid valve 83 is actuated to move the valve body 92 to the position shown in FIG. 1, in which the port 88 is in communication with the port 89 and isolated from the port 87.

In operation, when the engine is shut down, fuel vapors in the fuel tank 79 pass through the conduit 82 into the canister 80 where the absorption takes place. Fuel vapors in the carburetor float bowl 78 pass through the conduit 83 and the port 88 into the solenoid valve 84 and thereafter through the port 87 and the conduit 85 into the canister 80, with the solenoid valve 84 kept inoperative. On the other hand, when the engine is started, the solenoid valve 84 is actuated to bring the port 88 into communication with the port 89, connecting the float bowl 78 directly to the air horn 91. As a result, the fuel vapors in the float bowl 78 are drawn into the carburetor throat and burned in the engine.

Figure 4:
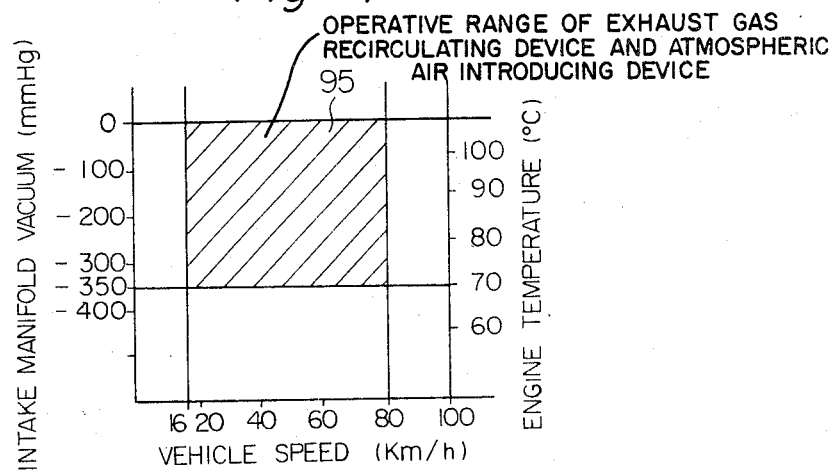

The present centralized control system further includes an exhaust gas recirculating device and an atmospheric air introducing device disclosed in our co-pending U. S. Ser. Nos. 18,662 and 17,142, respectively. These devices, when activated, serve to reduce the amount of nitrogen oxides contained in the engine exhaust gases. These devices are operative during those conditions of the engine in which at high engine temperatures the vehicle is accelerated or is climbing up a hill. Such engine operating conditions are determined by the controller 31 in accordance with electric signals supplied thereto from the vehicle speed sensor 10, intake manifold vacuum sensor 11 and engine temperature sensor 13. The range of engine operating conditions in which the exhaust gas recirculating device and the atmospheric air introducing device are placed in operation is exemplified by the hatched area 95 of FIG. 4.

The exhaust gas recirculating device comprises a filter 96 connected through a conduit 97 to the muffler 77, a solenoid valve 98 connected through a conduit 99 to the filter 96 and a nozzle 100 mounted in the intake manifold 19 and leading to the solenoid valve 98 through a conduit 101. The coil of the solenoid valve 98 has its one end connected to the controller 31 through a line 102 and its other end to the battery 39 through lines 103, 104 and 71. In operation, when the engine operating condition falls in the range as represented by the hatched area 95 of FIG. 4, the controller 31 operates to connect the line 102 leading to the solenoid valve 98 to ground so as to actuate it to open. Then, the exhaust gases are recirculated through the filter 96, solenoid valve 98 and nozzle 100 into the intake manifold 19.

On the other hand, the atmospheric air introducing device comprises a solenoid valve 105 which is connected to the controller 31 and battery 39 in parallel with the solenoid valve 98. The solenoid valve 105 has its inlet port 106 connected to the canister 80 through a conduit 107 and its outlet port to the opening 18 in the intake manifold 19 through a conduit 108. In operation, when the engine operating condition falls in the hatched area 95 of FIG. 4, the solenoid valve 105 is actuated to bring the inlet 106 into communication with the outlet, allowing atmospheric air to be drawn from the air cleaner 73 into the intake manifold 19 through the conduit 86, canister 80, conduit 107, solenoid valve 105 and conduit 108. The flow of the atmospheric air through the canister 80 in a downward direction as viewed in FIG. 1 will backwash the absorbent materials 81 in a manner to desorb the fuel constituents which were absorbed previously on the absorbent materials 81.

Figure 5:
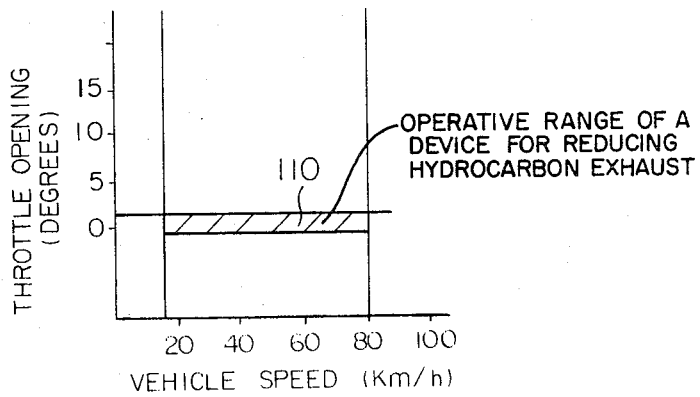

Also included in the present centralized control system is a device for enriching the air-fuel mixture to be supplied to the engine cylinders during those conditions in which the vehicle is braked by the engine, that is, being decelerated or descending a hill (disclosed in our co-pending U. S. Ser. No. 7,005). The device, when actuated, serves to reduce the quantity of carbon monoxides and hydrocarbons contained in the exhaust gases. The device is adapted to be kept operative in the range of engine operating conditions shown by the hatched area 110 of FIG. 5. As shown, the device comprises a circuit 111 in the carburetor leading from the float bowl 78 into the throttle chamber 112 downstream of the throttle valve 113 and a solenoid valve 114 for controlling the flow of enriched air-fuel mixture through the circuit 111 in response to changes in the engine operating conditions. The coil of the solenoid valve 114 has its one end connected to the controller 31 through a line 115 and its other end to the battery 39 through lines 116, 104 and 71. In operation, when the engine operating condition falls in the range as shown in FIG. 5, the controller 31 operates to connect the line 115 leading to the solenoid valve 114 to ground so as to actuate it to open. Then, the valve body 117 is moved rightward as viewed in FIG. 1, opening the circuit 111 so that the enriched air-fuel mixture is supplied to the engine cylinders.

Figure 6:
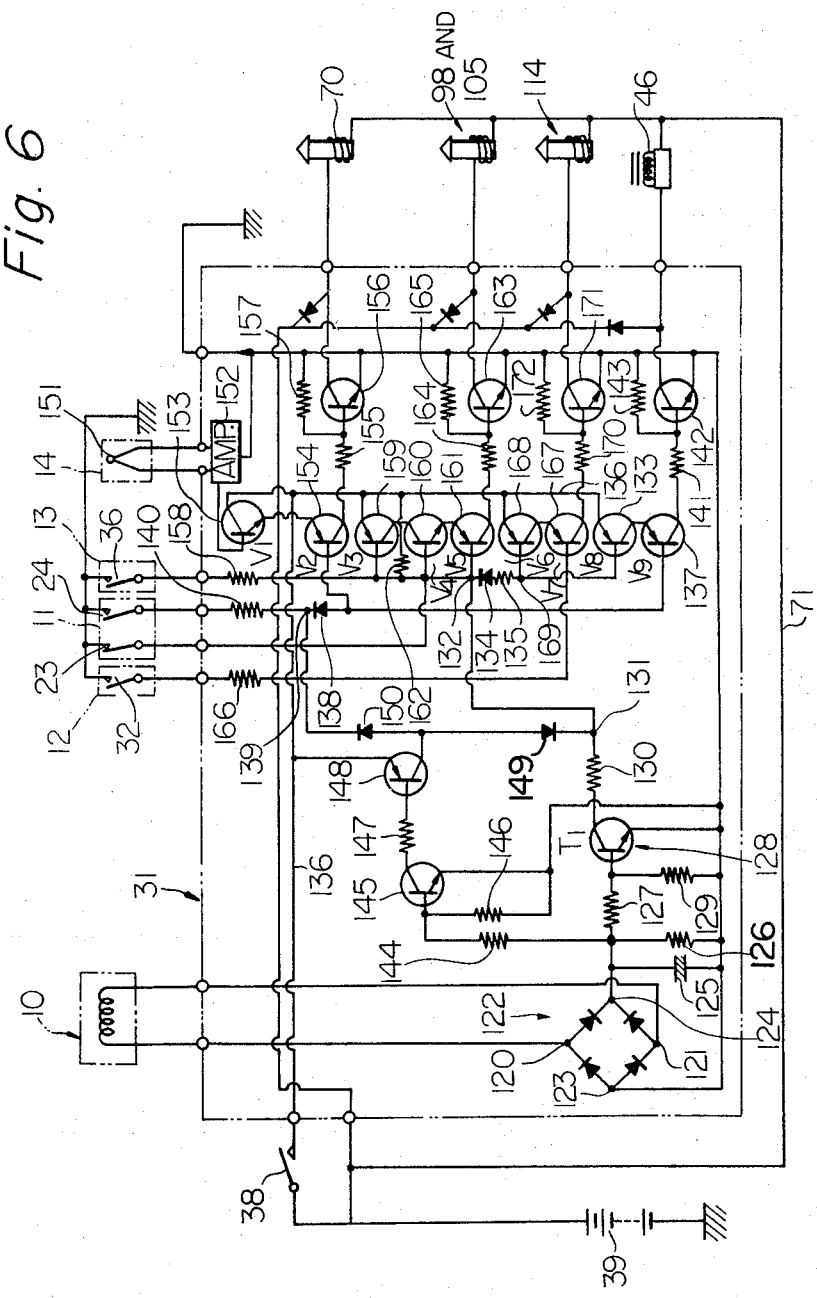
FIG. 6 is a circuit diagram showing a typical controller used in the present centralized control system.

In FIG. 6, there is shown a circuit diagram of an example of the controller 31 for activating the above-described air-pollution preventive devices, together with the electrical portions of the five sensors. The coil of the vehicle speed sensor 10 is connected to the diametrically opposite terminals 120 and 121 of a bridge rectifier 122. The other diametrically opposite terminals 123 and 124 are connected across a parallel combination of capacitor 125 and resistor 126, which combination serves as an integrator. One end of the resistor 126 is connected through a resistor 127 to the base of an NPN transistor 128 so that a DC voltage proportional to vehicle speed is applied thereto. The transistor 128 has its emitter grounded and its base also grounded through a variable resistor 129. The variable resistor 129 is so adjusted that, when the vehicle speed rises to a first predetermined value, for example, 16 kilometers per hour, the transistor 128 is rendered conducting. The collector of the transistor 128 is connected through a resistor 130 to a point 131 which in turn is connected to a point 132. The latter 132 is connected to the base of a PNP transistor 133 through a series combination of diode 134 and resistor 135. The transistor 133 has its emitter connected to a bus line 136 leading to the ignition switch 38 which in turn is connected to the battery 39. The collector of the transistor 133 is connected to the emitter of a PNP transistor 137 the base of which is connected through a diode 138 to a point 139. To the point 139 is connected through a resistor 140 the movable contact of the first switch 24 as shown in FIG. 1, which forms part of the intake manifold vacuum sensor 11. The first switch 24 is adapted to be closed when the intake manifold vacuum increases to −150 mmHg, as described above. The transistor 137 has its collector connected through a resistor 141 to the base of an NPN transistor 142, the emitter thereof being grounded. The base of the transistor 142 is also grounded by way of a resistor 143. The collector of the transistor 142 is connected to one end of the retard relay coil 46 which forms part of the ignition timing retarding device 40 shown in FIG. 1. The other end of the relay coil 46 is connected through the line 71 to the battery 39.

Connected at the one end of the resistor 126 is a resistor 144 which is connected to the base of an NPN transistor 145 so that the d.c. voltage proportional to vehicle speed is applied thereto. The transistor 145 has its emitter grounded and its base also grounded by way of a variable resistor 146. The variable resistor 146 is so adjusted that, when the vehicle speed rises to a second predetermined value, for example, 80 kilometers per hour, the transistor 145 is rendered conducting. The collector of the transistor 145 is connected through a resistor 147 to the base of a PNP transistor 148, the emitter thereof being connected to the bus line 136. The collector of the transistor 148 is connected to the point 131 through a diode 149 and also to the point 139 through a diode 150.

In the operation of the circuit portion associated with the ignition timing retarding device, when the engine operating condition falls in the range 41 of FIG. 2, the transistor 128 is rendered conducting and the switch 24 is closed. The transistor 128 being rendered conducting, the voltages appearing at the points 131 and 132 drop to near zero so that the transistor 133 is rendered conducting. On the other hand, with the switch 24 closed, the base of the transistor 137 is grounded through the diode 138 and resistor 140, thereby rendering the transistor 137 conducting. Thus, the positive voltage on the bus line 136 is applied through the emitter-collector paths of the transistors 133 and 137 and the resistor 141 to the base of the transistor 142, rendering it conducting. As a result, a current path from the battery 39 through the line 71, relay coil 46 and transistor 142 to ground is established to actuate the retard relay 44 so that a desired retardation of ignition timing is accomplished.

When the vehicle speed exceeds the second predetermined value, the transistor 145 and accordingly the transistor 148 are rendered conducting. This causes the bus line 136 to be grounded through the transistor 148, diode 149, resistor 130 and transistor 128 and through the transistor 148, diode 150, resistor 140 and switch 24. As a result, the entire circuit shown in FIG. 6 is rendered inoperative.

The exhaust temperature sensor 14 is shown as comprising a thermocouple 151 connected to an amplifier 152. The output of the amplifier 152 is applied to the base of an NPN transistor 153, the collector thereof being connected to the the bus line 136. The transistor 153 has its emitter connected to the emitter of a PNP transistor 154 and its base to the positive terminal of the diode 138. The collector of the transistor 154 is connected through a resistor 155 to the base of a PNP transistor 156. The base of transistor 156 is also connected through a resistor 157 to ground. The emitter also is directly grounded. The collector of the transistor 156 is connected to one end of the solenoid coil 70 associated with the exhaust gas after-burning device, the other end of which is connected through line 71 to battery 39.

In the operation of the circuit portion associated with the exhaust gas after-burning device, when the exhaust temperature decreases below a predetermined value, for example, 1,000° C, the output voltage of the amplifier 152 as applied to the base of the transistor 153 increases to such an extent as to render it conducting, so that the positive voltage on the bus line 136 is applied through the collector emitter path of the transistor 153 to the emitter of the transistor 154. Thus, if the first switch 24 of the intake manifold vacuum sensor 11 is closed, the transistor 154 is rendered conducting to render the following transistor 156 conducting. As a result, the coil 70 of the solenoid valve 69 associated with the exhaust gas after-burning device is energized.

The switch 36 of the engine temperature sensor 13 which is arranged to be closed when the engine temperature exceeds a predetermined value, for example, 70° C, is connected through a resistor 158 to the base of a PNP transistor 159, the emitter thereof being connected to the bus line 136. The collector of the transistor 159 is connected to the collector of an NPN transistor 160. The transistor 160 has its emitter connected to the emitter of a PNP transistor 161 and its base to the bus line 136 through a resistor 162. The base of the transistor 161 is also connected to the movable contact of the second switch 23 which forms part of the intake manifold vacuum sensor 11. The switch 23 is normally kept closed and is opened when the intake manifold vacuum increases to a second predetermined value, for example, −350 mmHg. The transistor 161 has its base connected to the point 132 leading to the collector of the transistor 128 and its collector to the base of an NPN transistor 163 through a resistor 164. The base of the transistor 163 is also grounded through a resistor 165. The transistor 163 has its emitter grounded and its collector connected to one end of the coils of the solenoid values 98 and 105 associated with the exhaust gas recirculating device and the atmospheric air introducing device, respectively. The other ends of the solenoid coils are connected through the line 71 to the battery 39.

In the operation of the circuit portion which governs the exhaust gas recirculating device and the atmospheric air introducing device, the second switch 23 of the intake manifold vacuum sensor 11 is kept closed to ground the base of the transistor 160 until the intake manifold vacuum reaches the second predetermined value. When the engine temperature exceeds the predetermined value, the switch 36 is closed to ground the base of the transistor 159, rendering it conducting. The collector of the transistor 160 is thus connected to the bus line and render it conductive, so that the collector of the transistor 161 is connected to the bus line 136 through the transistors 159 and 160. Thus, if the transistor 128 is rendered conducting to ground the base of the transistor 161 through the resistor 130 when the vehicle speed reaches the first or lower predetermined value, the transistor 161 is rendered conducting, thereby rendering the following transistor 163 also conducting. As a result, the solenoid valves 98 and 105 associated with the exhaust gas recirculating device and the atmospheric air introducing device are placed in operation.

The switch 32 of the throttle opening sensor 12 is connected through a resistor 166 to the base of a PNP transistor 167. The transistor 167 a has its emitter connected to the collector of a PNP transistor 168 whose base is connected to a point 169 between the resistor 135 and the base of the transistor 133. The emitter of the transistor 168 is connected to the bus line 136. The collector of the transistor 167 is connected through a resistor 170 to the base of a PNP transistor 171, the emitter thereof being grounded. The base is also grounded through a resistor 172. The collector of the transistor 171 is connected to one end of the coil of the solenoid valve 114 associated with the device for reducing hydrocarbon emissions during deceleration. The other end of the coil is connected through the line 71 to the battery 39.

In operation, when the vehicle speed exceeds the first predetermined value, the base of the transistor 168 is grounded through the resistor 135, diode 134, resistor 130 and collector-emitter path of the transistor 128, so that the transistor 168 is rendered conductive. This causes a positive voltage appearing on the bus line 136 to be applied to the emitter of the transistor 167. Under this condition, if the throttle valve 113 is moved to the closed position so as to close the switch 32, the transistor 167 is rendered conducting, causing the following transistor 171 to become conducting. Eventually, the solenoid valve 114 is actuated to activate the above-described hydrocarbon exhaust reducing device.

What is claimed is:

1. A system for minimizing harmful components contained in exhaust gases emitted from an automotive internal combustion engine, comprising a plurality of vehicular air-pollution preventive devices adapted to be kept operative under individual predetermined conditions of engine operation, a plurality of sensors for sensing engine operating conditions to produce electric signals corresponding thereto, and a controller responsive to the electric signals for determining said individual predetermined conditions to activate said plurality of air-pollution preventive devices, said plurality of sensors including a vehicle speed sensor, an intake manifold vacuum sensor, a throttle opening sensor, an engine temperature sensor and an exhaust temperature sensor which sensors are electrically connected to said controller.

2. A system for minimizing harmful components contained in exhaust gases emitted from an automotive internal combustion engine, comprising a plurality of air-pollution preventive devices adapted to be operative under individual predetermined conditions of engine operation, a plurality of sensors for sensing engine operating conditions to produce electric signals corresponding thereto, and a controller responsive to the electric signals for determining said individual predetermined conditions to activate said plurality of air-pollution preventive devices, said plurality of vehicular air-pollution preventive devices, including an ignition timing retarding device, an exhaust gas afterburning device, a fuel vapor trapping device, an exhaust gas recirculating device, an atmospheric air introducing device and a device for reducing hydrocarbon exhaust during deceleration, which devices are connected to said controller, and said plurality of sensors including a vehicle speed sensor, an intake manifold vacuum sensor, a throttle opening sensor, an engine temperature sensor and an exhaust temperature sensor, which sensors are also connected to said controller.

3. A system according to claim 2, in which said vehicle speed sensor comprises an a.c. generator having a rotor drivably connected to a rotating shaft of a speed meter so as to produce an electric signal corresponding to vehicle speed.

4. A system according to claim 2, in which said intake manifold vacuum sensor comprises a spring-loaded and air-tight diaphragm, the spring-loaded side of said diaphragm being connected through a vacuum line to an opening in said intake manifold, an elongated member operatively connected to said diaphragm for axial movement therewith and having a small diameter portion, and two switches having arms with respective legs which are adapted to rest on the surface of said elongated member, said switches being kept open while their legs rest on the small diameter portion of said elongated member.

5. A system according to claim 4, in which said small diameter portion is so positioned in said elongated member that one of said switches is closed when the intake manifold vacuum increases to a first predetermined value and that the other is opened when the intake manifold vacuum increases to a second predetermined value.

6. A system according to claim 5, in which said first and second predetermined values are approximately −150 and −350 mmHg, respectively.

7. A system according to claim 2, in which said throttle opening sensor comprises a switch whose arm is operatively associated with the throttle valve so as to open said switch when said throttle valve is opened to a predetermined degree.

8. A system according to claim 2, in which said engine temperature sensor comprises a bimetal placed in the engine cooling water passage and adapted to close a switch when the engine temperature increases to a predetermined value.

9. A system according to claim 8, in which said predetermined value is approximately 70° C.

10. A system according to claim 2, in which said exhaust temperature sensor comprises a thermocouple placed in the exhaust gas passage.

11. A system according to claim 2, in which said controller includes a first conductive element connected to said vehicle speed sensor and adapted to become conducting when the vehicle speed exceeds a first predetermined value, a second conductive element connected to said vehicle speed sensor and adapted to become conducting when the vehicle speed exceeds a second predetermined value higher than said first predetermined value, a third conductive element connected to said first conductive element and adapted to become conducting upon conduction of said first conductive element, a fourth conductive element connected to said intake manifold vacuum sensor and said third conductive element and adapted to become conducting when the intake manifold vacuum exceeds a first predetermined value, and a fifth conductive element adapted to become conductive upon conductions of said third and fourth conductive elements thereby activating said ignition timing retarding device.

12. A system according to claim 11, in which said first and second predetermined vehicle speeds are approximately 16 and 80 kilometers per hour, respectively, and said first predetermined intake manifold vacuum is approximately −150 mmHg.

13. A system according to claim 11, in which said second conductive element renders said controller inoperative when said second predetermined vehicle speed has been reached.

14. A system according to claim 11, in which said controller includes a sixth conductive element connected through an amplifier to said exhaust temperature sensor and adapted to become conducting when the exhaust temperature decreases below a predetermined value, a seventh conductive element connected to said intake manifold vacuum sensor and said sixth conductive element and adapted to become conducting when the intake manifold vacuum exceeds said first predetermined value, and an eighth conductive element adapted to become conducting upon conductions of said sixth and seventh conductive elements thereby activating said exhaust gas after-burning device.

15. A system according to claim 14, in which said predetermined exhaust temperature is approximately 1,000° C.

16. A system according to claim 11, in which said controller includes a ninth conductive element connected to said engine temperature sensor and adapted to become conductive when the engine temperature excceds a predetermined value, a tenth conductive element connected to said intake manifold vacuum sensor and said ninth conductive element and adapted to be kept conducting until the intake manifold vacuum exceeds a second predetermined value, an eleventh conductive element connected to said first and tenth conductive elements and adapted to become conducting upon conduction of said first conductive element, and a twelfth conductive element adapted to become conductive upon conductions of said ninth, tenth and eleventh conductive elements thereby activating said exhaust gas recirculating device and said atmospheric air introducing device.

17. A system according to claim 16, in which said predetermined engine temperature is approximately 70° C and said second predetermined intake manifold vacuum is approximately −350 mmHg.

18. A system according to claim 11, in which said controller includes a thirteenth conductive element connected to said first conductive element and adapted to become conducting upon conduction of said first conductive element, a fourteenth conductive element connected to said throttle opening sensor and said thirteenth conductive element and adapted to become nonconducting when the throttle valve is opened to a predetermined degree, and a fifteenth conductive element adapted to become conducting upon conductions of said thirteenth and fourteenth conductive elements thereby actuating said device for reducing hydrocarbon exhaust during deceleration.

19. A system according to claim 18, in which said predetermined degree is approximately zero degrees.

* * * * *